United States Patent [19]

Nilsson

[11] Patent Number: 4,566,018

[45] Date of Patent: Jan. 21, 1986

[54] RECORDER OPERATING WITH DROPS OF LIQUID

[75] Inventor: Kenth Nilsson, Akersberga, Sweden

[73] Assignee: Siemens Aktiengesellschaft, Berlin & Munich, Fed. Rep. of Germany

[21] Appl. No.: 606,994

[22] Filed: May 3, 1984

[30] Foreign Application Priority Data

May 10, 1983 [DE] Fed. Rep. of Germany ....... 3317082

[51] Int. Cl.[4] .......................... G01D 15/18; B41J 3/04

[52] U.S. Cl. ................................ 346/140 R; 310/330

[58] Field of Search ................. 346/140 PD; 310/330, 310/331, 368, 370

[56] References Cited

U.S. PATENT DOCUMENTS 4,072,959 2/1978 Elmqvist ...................... 346/140 PD 4,409,601 10/1983 Nilsson et al. ............... 346/140 PD 4,438,441 3/1984 Bolmgren et al. ........... 346/140 PD 4,453,169 6/1984 Martner ....................... 346/140 PD

*Primary Examiner*—George H. Miller, Jr.

*Attorney, Agent, or Firm*—Hill, Van Santen, Steadman & Simpson

[57] ABSTRACT

The disclosure relates to a recorder operating with drops of liquid for recording respective points of an analog curve or alphanumerical characters and/or images on a recording medium. In one embodiment elongated piezo-electric transducers are provided for producing the drops of liquid, the piezo-electric transducers being disposed in rows, being clamped at one end and being contacted such that they bend perpendicularly to a plane through the transducers in response to electrical potential changes at the contacting. In order to obtain a recorder that is relatively simple in structure wherein, moreover, a close application of a plurality of rows of transducers behind one another is also provided, it is inventively proposed that a carrier plate be disposed parallel to the transducers at such a distance therefrom that writing fluid is ejected in about the transducer longitudinal direction from a writing fluid receiving space between the individual transducer and the carrier plate when the transducer is released from an energized position and allowed to return to an initial deenergized position by virtue of the restoring force resulting from the resilience of the transducer.

9 Claims, 9 Drawing Figures

RECORDER OPERATING WITH DROPS OF LIQUID

BACKGROUND OF THE INVENTION

The invention relates to a recorder operating with drops of liquid for forming individual points of analog curves or alphanumerical characters and/or of images on a recording medium, wherein piezoelectric transducers are provided for producing the drops of liquid, said piezoelectric transducers being reed-shaped, disposed in rows, mounted at one end and electrically contacted such that they bend perpendicularly to a plane through the transducers in response to electrical potential variations at the contacts.

Such a recorder is known from U.S. Pat. No. 4,072,959 issued Feb. 7, 1978. One embodiment thereof comprises a carrier disposed between the recording medium and the transducers and parallel to the plane of the transducers. The carrier has a plurality of jet orifices disposed next to one another. Each et orifice has an inlet adjacent the zone of the transducer which has the greatest oscillatory amplitude, the orifice axis being aligned with the direction of excursion of the respective transducer. When recording multicolored characters or images, a plurality of rows of these transducers must be disposed behind one another in the paper conveying direction. Due to the length of the transducers, the loci of the ink droplets from the respective rows are at a considerable distance from one another, so that an undesired dislocation between the individual color spots can easily occur due to incorrect paper transport. Deterioration of the image can also occur given the employment of two or more rows of transducers in order to increase the resolution.

It is further known from an exemplary embodiment shown in the aforementioned U.S. Pat. No. 4,072,959 that the transducers may extend perpendicularly relative to the recording medium so that the axes of orifices are disposed in direct alignment with the length dimensions of the transducers. It has been shown, however, particularly given small dimensions, that the transducers not only elongate in a straight-line fashion but also bend in response to electrical potential variations at their contacts. Malfunctions can therefore appear when drops of liquid are ejected from the jets with this type of embodiment.

SUMMARY OF THE INVENTION

A principal object of the invention is to create a recorder of the type initially cited that is relatively simple in structure and wherein a dense application of a plurality of rows of transducers behind one another is possible. This object is inventively achived in that a plate is disposed parallel to the transducers at such a distance therefrom that writing fluid is ejected from a writing fluid receiving space between each individual transducer and the plate as the transducers are allowed to deflect toward the plate and into their initial position after being driven into an energized position where they are deflected away from the plate. These transducers can operate without jet orifices, this significantly simplifying the printer. Under certain conditions, this leads to larger drops of liquid and this can sometimes be advantageous when printing characters.

It is proposed in an advantageous development of the invention that the carrier plate for the transducers have grooves that extend parallel to the length to the respective transducers. The shaping and the alignment of the ejected liquid droplets is thereby improved.

It is proposed in a further embodiment of the invention that a front wall member be attached between the transducer-carrier plate assembly and the recording medium, whereby each jet orifice has its axis aligned with an axial extension of the clearance between the corresponding transducer and the carrier plate. The groves can be omitted in this embodiment. Liquid can now be ejected through the jet orifices of the wall member as a result of the inventive structure of the transducer. Simultaneously achieved as a result thereof is that all drops of liquid have an identical, defined size.

It is proposed in a further development of the invention that rows of the transducers be disposed at respective opposite sides of the carrier. Achieved as a result thereof is that the rows of transducers can be applied extremely closed spaced behind one another.

The invention shall be explained in detail below with reference to a number of exemplary embodiments in conjunction with the accompanying drawing sheets; and other objects, features and advantages will be apparent from this detailed disclosure and from the appended claims.

DETAILED DESCRIPTION

Figure 8:
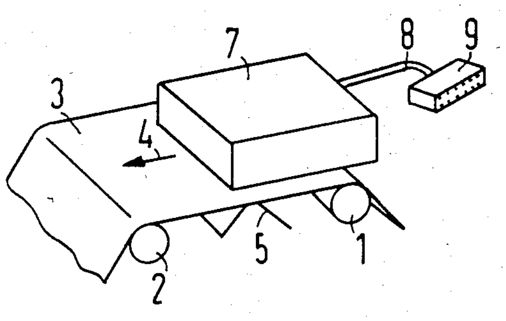
FIG. 8 is schematic overall isometric view of a recorder system according to the invention.

The external, fundamental structure of a recorder system may be seen from FIG. 8. A recording medium 3, for example standard recording paper, is drawn by transport rollers 1 and 2 past the housing 7 in the direction of the arrow 4 over a spacer 5. The connecting cable 8 has its conductors extending into the housing 7, the connecting cable 8 being equipped at its free end with a plug for connecting to a control device (not shown) that supplies the control signals for recording the desired curves, characters or images.

Figure 1:
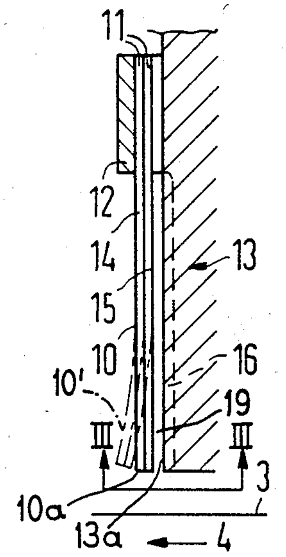
FIG. 1 is a schematic side view partly in section showing essential parts of a recorder according to the invention.

It is shown in FIG. 1 how bar-shaped or reed-shaped piezoelectric transducers 10 which are disposed in the housing 7, extend perpendicularly to the recording medium 3. The transducers 10, which are designed as teeth of a comb configuration (FIG. 2), function as flexural vibrators. The body portion 11 of the comb configuration shared by all transducers 10 is secured by a fastening appliance 12 to a carrier plate 13 rigidly disposed in the housing 7. It is shown in FIG. 1 that the transducers are bilaminar and are formed of a piezoceramic layer 4 and a metal layer 15. Writing fluid is provided between the carrier plate 13 and the transducers 10. Given application of electrical voltage to a contact of an individual transducer 10, such transducer 10 moves into a deflected energized position shown with broken lines at 10' in FIG. 1. Upon short-circuiting of the contacts of the transducer 10, it snaps back into the initial deenergized position shown with solid lines and thereby squeezes a droplet of writing fluid toward the front for ejection onto the ecording medium 3 in the direction of the transducer longitudinal axis. This embodiment of the transducers 10 with carrier plate 113 is preferably employed when larger drops of liquid are desired.

It is also indicated with broken lines in FIGS. 1 and 2 that the carrier plate 13 has grooves 15 that extend below and parallel to the respective transducer 10. The grooves 16 may be clearly seen in FIG. 3.

Figure 4:
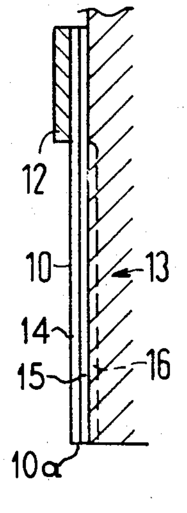
FIG. 4–7 show further exemplary embodiments of the essential parts of recorders in accordance with the invention.

It is shown in FIG. 4 that, given a carrier plate 13 provided with grooves 16, the transducers can be attached close to said carrier plate so that a unit exhibiting a compact structure is obtained. Very good resolution and a uniformly good alignment of the individual ink ejections can be achieved by means of the grooves.

Figure 9:
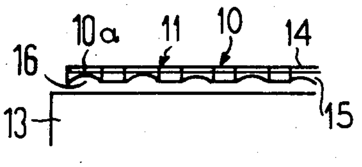
FIG. 9. is a view similar to FIG. 3 but showing grooves in the transducers.

It is shown in FIG. 9 that grooves 16 can be provided in the individual transducers 10 instead of in the carrier plate 13.

Figure 5:
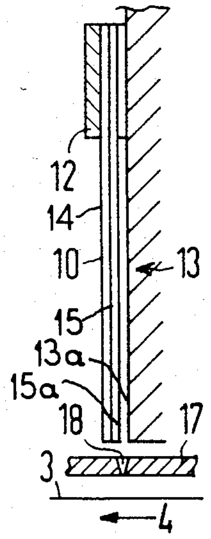

Showing a further exemplary embodiment, FIG. 5 shows that a front wall 17 of housing 7 is disposed between transducers 10 and the recording medium 3, such that the axis of each orifice 18 of the wall 17 is aligned with the ink receiving space between an associated individual transducer 10 and the carrier plate 13. The grooves can be omitted given this embodiment shown in FIG. 4. A predetermined, exact shaping and alignment of the drops of liquid can be obtained by means of the orifices 18.

Figure 6:
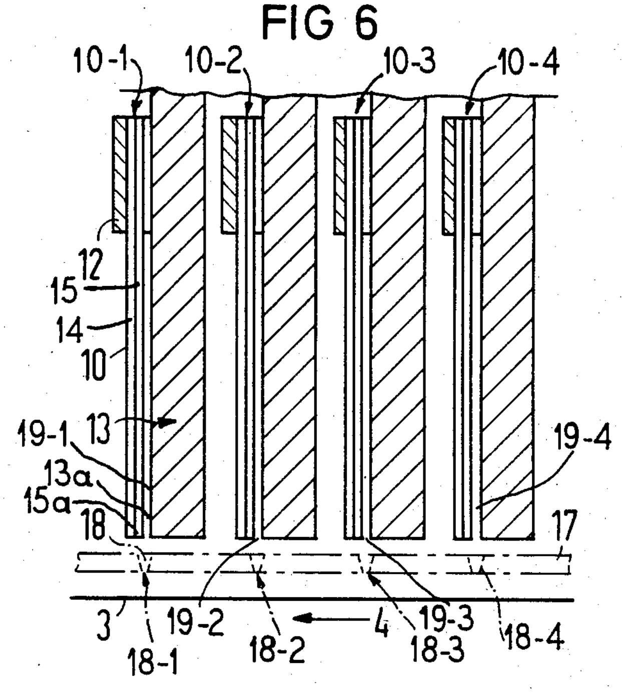

FIG. 6 shows the construction of a plurality of rows of transducers 10 with carrier plates 13, close behind one another in the recorder housing 7. The relatively slight distance between the successive rows such as 10-1, 10-2, 10-3 and 10-4 of the transducers 10 is of great significance particularly when printing characters or images with different colors since the characters or images can be obtained with great clarity.

Figure 7:
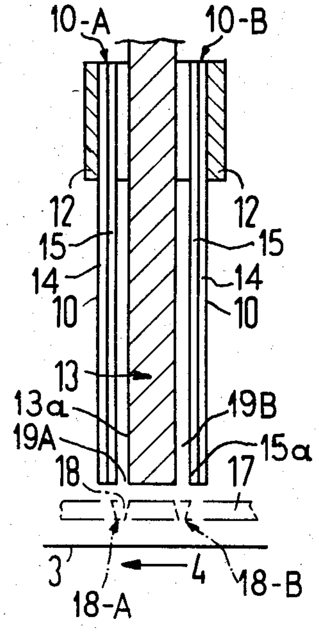

FIG. 7 shows an embodiment where rows 10-A and 10-B of transducers 10 are secured to opposite sides of the carrier plate 13. As a result thereof, the transducers 10 can be applied extremely close to one another.

The front wall 17 with orifices 17 is not absolutely necessary given the exemplary embodiments according to FIGS. 6 and 7. Instead, the carrier plates can be provided with grooves 16 (FIGS. 1–4). Both the front wall 17 as well as the grooves may be omitted.

It will be apparent that many modifications and variations may be made without departing from the scope of the teachings and concepts of the present invention.

Supplementary Discussion

Figure 2:
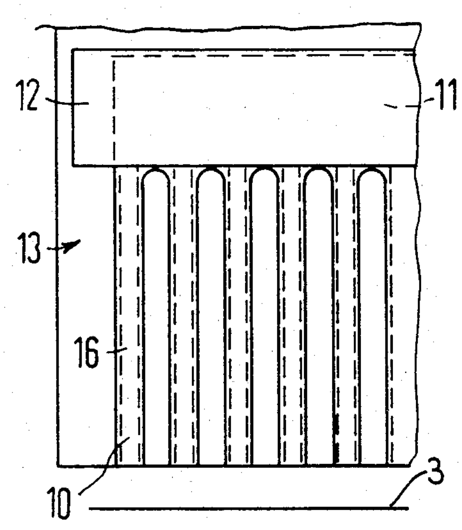
FIG. 2 is a plan view of a comb-like piezo-plate with reed-like transducers according to FIG. 1.
Figure 3:
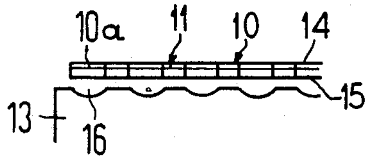
FIG. 3 is a schematic partial view of a piezo-plate according to FIGS. 1 and 2 and taken in the direction indicated at III—III in FIG. 1.

FIG. 1 may be taken at an end of the comb assembly 10, 11 of FIG. 2 such that the comb assembly is seen in end elevation in FIG. 1, only the fastening appliance 12 being in section along with carrier plate 13 in FIG. 1. In this arrangement base 11 comprises a piezo-ceramic base portion integral with the piezo-ceramic reed-shaped element of layer 14 and a metal base portion integral with the metal reed-shaped element of layer 15.

the main function of the metal layer 15 is to resist contraction/expansion along its length-axis. The piezoelectric layer 14 adopts two different lengths. With voltage applied it contracts to a length which is shorter than that of the layer 15, This results in a bending movement of the transducer. With zero voltage applied (shortcircuited transducer) the piezoelectric layer 14 adopts its original length which is equal to the length of the metal layer 15 and consequently the transducer returns to its flat resting position. Thus the piezo-electric layer 14 plays an active role in both deflection and return action of the transducer.

(The energized position of the transducer is shown at 10' in FIG. 1. The deenergized position of the deflectable zone 10a of each transducer is shown in solid outline in FIGS. 1, 3 through 7 and 9. The return action of the transducer provides a drop-ejecting movement of the deflectable zone 10a for ejecting a drop of ink or other writing fluid from the ink receiving space such as indicated at 19, FIG. 1, e.g. under the guidance of an associated groove 16, FIGS. 1–4, or FIG. 9, or e.g. under the guidance of confronting planar surfaces of the deflectable portion 15a of layer 15 and associated plate means 13a of plate 13, FIGS. 5, 6 and 7. The resiliency of layer 15 enhances the return action but layer 15 is thin and the additional bending force exerted by 15 is comparatively small.

The spacer 5, FIG. 8, may have a smooth guide surface which slidably engages the paper sheet 3 and determines the spacing of the plane of the paper sheet 3 from the housing front wall at the recording medium location where the drops of writing fluid are applied to the paper sheet 3.

Background information applicable to the present invention is found in the following:

Kenth Nilsson and Jan Bolmgren U.S. application for patent "Recording Apparatus Using Fluid Droplets" U.S. Ser. No. 483,874, filed Apr. 11, 1983, Assignee Ref. VPA 82 P 7303 US, and corresponding with German published application 32 14 791 (filed Apr. 21, 1982).

By way of example, the housing 7 of FIG. 8 may contain the transducer arrangement of FIG. 6, with the wall 17 forming the front wall of the housing 7 which confronts the recording medium 3, said front wall having rows of orifices 18 arranged at right angles to transport direction 4. The rows 10-1 through 10-4 then are aligned with the respected rows 18-1 through 18-4 of orifices in the front wall 17 of housing 7.

In FIG. 7, the jet orifices of row 18-A may be offset from the orifices of row 18-B in the lateral direction for increased resolution in the printing of images. Where parallel grooves 16 are present at each side of a single plate 13, the sets of grooves 16 would also be laterally offset so as to be aligned with the offset rows 18-A and 18-B.

Due to the small dimensions of the recorder and due to the fact that an underpressure is present in the recording fluid system, the recording fluid does not leak out of the housing 7. An underpressure in the system can be obtained in that the recording fluid supply reservoir is placed lower than the housing 7. This is customary in the case of recorders of this type.

For the embodiments such as those of FIGS. 1–4, 6 and 7 where the front wall 17 of the housing 7 facing the recording medium 3 is entirely omitted, the housing interior volume is filled with recording fluid in the spaces between the housing walls and the transducer assemblies and between the various elements of the transducer assemblies. Due to the small dimensions of these spaces within housing 7 and an underpressure in the recording system, the recording fluid remains in the housing except as forcibly ejected from the receiving spaces 19 by the selective actuation of the transducers.

Exemplary dimensions and the like are found in U.S. Pat No. 4,072,959, for example at column two, lines 31–36. See also the seventh and eighth claims of this U.S. Patent.

I claim as my invention:

1. A recorder operating with drops of liquid for recording of analog curves, alphanumerical characters and/or images on a recording medium at a recording medium location, said recorder comprising piezoelectric transducers with deflectable zones actuatable for producing drops of writing fluid, said piezoelectric transducers being reed-shaped and being mounted in at least one plane and having electrical contacts such that the deflectable zones deflect perpendicularly to the plane extending through the transducers in response to electrical potential variations at the contacts, said recorder further comprising plate means disposed parallel to said transducers and confronting said deflectable zones at such a distance that a drop of writing fluid is ejected from a writing fluid receiving space between a respective individual transducer and the plate means and toward the recording medium location during travel of the individual transducer toward the plate means after deflection of such transducer in a direction away from said plate means, characterized in that the plate means has grooves that extend parallel to the respective transducers and toward the recording medium location for guiding the drops of writing fluid.

2. A recorder operating with drops of liquid for recording of analog curves, alphanumerical characters and/or images on a recording medium at a recording medium location, said recorder comprising piezoelectric transducers with deflectable zones actuatable for producing drops of writing fluid, said pizoelectric transducers being reed-shaped and being mounted in at least one plane and having electrical contacts such that the deflectable zones deflect perpendicularly to the plane extending through the transducers in response to electrical potential variations at the contacts, said recorder further comprising plate means disposed parallel to said transducers and confronting said deflectable zones at such a distance that a drop of writing fluid is ejected from a writing fluid receiving space between a respective individual transducer and the plate means and toward the recording medium location during travel of the individual transducer toward the plate means after deflection of such transducer in a direction away from said plate means, characterized in that that side of each transducer which faces the plate means has a groove extending in the longitudinal direction of such transducer and toward the recording medium location.

3. A recorder operating with drops of liquid for recording of analog curves, alphanumerical characters and/or images on a recording medium at a recording medium location, said recorder comprising piezoelectric transducers with deflectable zones actuatable for producing drops of writing fluid, said pizeoelectric transducers being reed-shaped and being mounted in at least one plane and having electrical contacts such that the deflectable zones deflect perpendicularly to the plane extending through the transducers in response to electrical potential variations at the contacts, said recorder further comprising plate means disposed parallel to said transducers and confronting said deflectable zones at such a distance that a drop of writing fluid is ejected from a writing fluid receiving space between a respective individual transducer and the plate means and toward the recording medium location during travel of the individual transducer toward the plate means after deflection of such transducer in a direction away from said plate means, with the plate means comprising a carrier plate with a row of transducers mounted at each side of said carrier plate.

4. A recorder operating with drops of liquid for forming respective points of an analog curve, alphanumeric characters and/or images at a recording medium location, said recorder comprising piezoelectric transducers with deflectable zones actuatable for producing drops of writing fluid, said piezoelectric transducers having their deflectable zones lying in at least one plane, said recorder further comprising confronting plate means confronting the respective deflectable zones, said transducers having means for energizing the respective transducers to deflect the transducers at their respective deflectable zones and to selectively produce drop-ejecting movement of the respective deflectable zones toward the respective confronting plate means, said confronting plate means being disposed at such a distance from the respective deflectable zones that drops of writing fluid are ejected parallel to the plane of the deflectable zones and toward the recording medium location.

5. A recorder according to claim 4, with said transducers having piezoelectric layer means for exerting a restoring force for effecting a return of the reflectable zone of each transducer toward the respective confronting plate means upon deenergization of such transducer, thereby to produce the drop-ejecting movement of such deflectable zone.

6. A recorder according to claim 4, with a common plate mounting at least one row of said transducers and having said plate means for such row of transducers integral therewith.

7. A recorder according to claim 6, with said common plate having respective parallel grooves in the plate means thereof aligned with the respective deflectable portions of the respective transducers such that drops of writing fluid are directed toward the recording medium location by the respective grooves during drop-ejecting movement of the respective deflectable portions toward the respective grooves.

8. A recorder according to claim 6 with means for guiding a recording medium in a transport direction through a recording medium plane at said recording medium location, said common plate being disposed transversely to the transport direction and generally perpendicular to the plane of the recording medium at said recording medium location.

9. A recorder according to claim 8, with said common plate having respective parallel grooves in the plate means thereof aligned with the respective deflectable portions of the respective transducers and extending generally perpendicular to the plane of the recording medium at said recording medium location, said deflectable portions being disposed such that drops of writing fluid are directed toward the recording medium location by the respective grooves during drop-ejecting movement of the respective deflectable portions toward the respective grooves.

* * * * *